United States Patent
Yamamoto

(10) Patent No.: US 6,766,875 B2
(45) Date of Patent: Jul. 27, 2004

(54) PASSENGER RESTRAINT SYSTEM

(75) Inventor: Yukiteru Yamamoto, Hiratsuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 19 days.

(21) Appl. No.: 10/183,520

(22) Filed: Jun. 28, 2002

(65) Prior Publication Data
US 2003/0019679 A1 Jan. 30, 2003

(30) Foreign Application Priority Data
Jul. 27, 2001 (JP) ........................................ 2001-228101

(51) Int. Cl.$^7$ ........................ B60K 28/14; B60R 21/32
(52) U.S. Cl. ........................ 180/282; 280/735; 701/38; 701/45
(58) Field of Search ................................ 140/282, 271, 140/290; 280/734, 735; 340/429, 436, 438, 440, 665, 666; 307/10.1; 701/1, 36, 38, 45, 46

(56) References Cited

U.S. PATENT DOCUMENTS

| | | | | |
|---|---|---|---|---|
| 4,679,808 | A | * | 7/1987 | Ito et al. .................... 180/408 |
| 5,890,084 | A | * | 3/1999 | Halasz et al. ................. 701/45 |
| 5,925,084 | A | | 7/1999 | Gotoh et al. |
| 6,038,495 | A | * | 3/2000 | Schiffmann ..................... 701/1 |
| 6,169,946 | B1 | * | 1/2001 | Griessbach .................. 701/45 |
| 6,192,305 | B1 | * | 2/2001 | Schiffmann .................. 701/45 |
| 6,212,455 | B1 | * | 4/2001 | Weaver ....................... 701/45 |
| 6,282,474 | B1 | * | 8/2001 | Chou et al. ................... 701/45 |
| 6,433,681 | B1 | * | 8/2002 | Foo et al. ................... 340/440 |
| 6,496,759 | B1 | * | 12/2002 | Mattes et al. .................. 701/1 |

FOREIGN PATENT DOCUMENTS

JP          9-240399 A          9/1997

* cited by examiner

Primary Examiner—Charles T. Jordon
Assistant Examiner—Bret Hayes
(74) Attorney, Agent, or Firm—Shinjyu Global IP Counselors, LLP

(57) ABSTRACT

A passenger restraint system actuates a passenger restraint device more appropriately in situations where a vehicle rolls over. When the steering is turned in the same direction as the roll direction before the roll angle of the vehicle exceeds a threshold value, the passenger restraint system assumes the vehicle is headed toward recovery from the rollover behavior and subtracts a predetermined angle successively from the roll angle in accordance with the steering angle. Thus, the passenger restraint device is not actuated when the steering operation will stop the rollover behavior. On the other hand, the passenger restraint device is actuated when the steering is not operated and the vehicle rolls over, and when operation of the steering begins to effect a recovery but ultimately the vehicle rolls over anyway. In this situation, the passenger restraint system bypasses executing subtraction from the roll angle after the roll angular velocity exceeds a prescribed angular velocity.

4 Claims, 3 Drawing Sheets

PASSENGER RESTRAINT SYSTEM

BACKGROUND OF THE INVENTION

1. Field of the Invention

The present invention generally relates to a passenger restraint system that controls the operation of a passenger restraint device in accordance with the state of roll angular velocity centered about a longitudinal axis of a vehicle.

2. Background Information

A passenger restraint system is disclosed in Japanese Laid-Open Patent Publication No. 9-240399, in which a roll angular velocity sensor is used to detect the roll angular velocity of a vehicle about its longitudinal axis. The passenger restraint system of this publication has a control unit that actuates a passenger restraint device when the vehicle's rolling rate and rolling angle reach or exceed prescribed values. In particular, a first determination is made by the control unit to determine whether the vehicle's rolling rate reaches or exceeds a prescribed value for the rolling rate. Then, after a period of time, a second determination is made by the control unit to determine whether the vehicle's rolling angle reaches or exceeds a prescribed value for the rolling angle.

There are situations in which the passenger performs an operation that causes the vehicle to recover after the vehicle's rolling rate reaches or exceeds the prescribed value. In order to handle such situations, when the second determination does not occur within a prescribed amount of time after the first determination becomes affirmative, the aforementioned known system subtracts a prescribed angle from the roll angle successively and resets the first and second determinations when the roll angle obtained after subtracting falls below a minimum value.

In view of the above, there exists a need for an improved passenger restraint system. This invention addresses this need in the art as well as other needs, which will become apparent to those skilled in the art from this disclosure.

SUMMARY OF THE INVENTION

It has been discovered that in the aforementioned passenger restraint system, if a vehicle falls down an embankment, then it is possible for the system not to accurately calculate the roll angle. In particular, in this situation, the roll angular velocity first exceeds the prescribed value and the first determination becomes affirmative when the vehicle shifts from a state of normal travel to a state of falling down the embankment. Afterwards, the roll angle does not change very much while the vehicle is traveling down the embankment without rolling over. Consequently, the prescribed amount of time elapses before the roll angle exceeds the prescribed value (second determination) and this system successively subtracts the prescribed angle from the roll angle. Thus, in such a case where the vehicle travels down an embankment without initially rolling over but rolls over a short while afterwards, there is the possibility that a difference will exist between the actual roll angle and the calculated roll angle. Thus, the system may not accurately calculate the roll angle.

Therefore, an object of the present invention is to eliminate the occurrence of a difference between the actual roll angle and the calculated roll angle by not executing subtraction from the roll angle in cases where the passenger does not perform a vehicle recovery operation after the roll angular velocity exceeds the prescribed angular velocity and, thus, to actuate the passenger restraint device more appropriately in situations where the vehicle rolls over thereafter.

In accordance with the present invention, a passenger restraint system is provided that basically comprises a roll angular velocity detecting device, a roll angle calculating device, a steering angle detecting device, a passenger restraint device and a control unit. The roll angular velocity detecting device is configured to detect a roll angular velocity about a longitudinal axis of a vehicle. The roll angle calculating device is configured to calculate a roll angle of the vehicle based on the roll angular velocity detected by the roll angular velocity detecting device. The steering angle detecting device is configured to detect a steering angle. The passenger restraint device is configured to restrain a passenger. The control unit is configured to actuate the passenger restraint device when the roll angular velocity detected by the roll angular velocity detecting device exceeds a prescribed angular velocity and the roll angle calculated by the roll angle calculating device exceeds a first prescribed angle. The control unit is further configured to subtract a prescribed value from the detected roll angle successively, when the roll angular velocity detected by the roll angular velocity detecting device exceeds the prescribed angular velocity and the steering angle detecting device detects a steering angle oriented toward a side of the vehicle in which the vehicle is rolling before calculation of the roll angle by the roll angle calculating device exceeds the first prescribed angle. The control unit is further configured to reset a determination of whether or not the roll angular velocity is greater than or equal to the prescribed angular velocity and a determination of whether or not the roll angle is greater than or equal to the first prescribed angle, when the roll angle obtained after subtracting falls below a second prescribed angle.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration purposes only, and not for the purpose of limiting the invention as defined by the appended claims and their equivalents.

Figure 3:
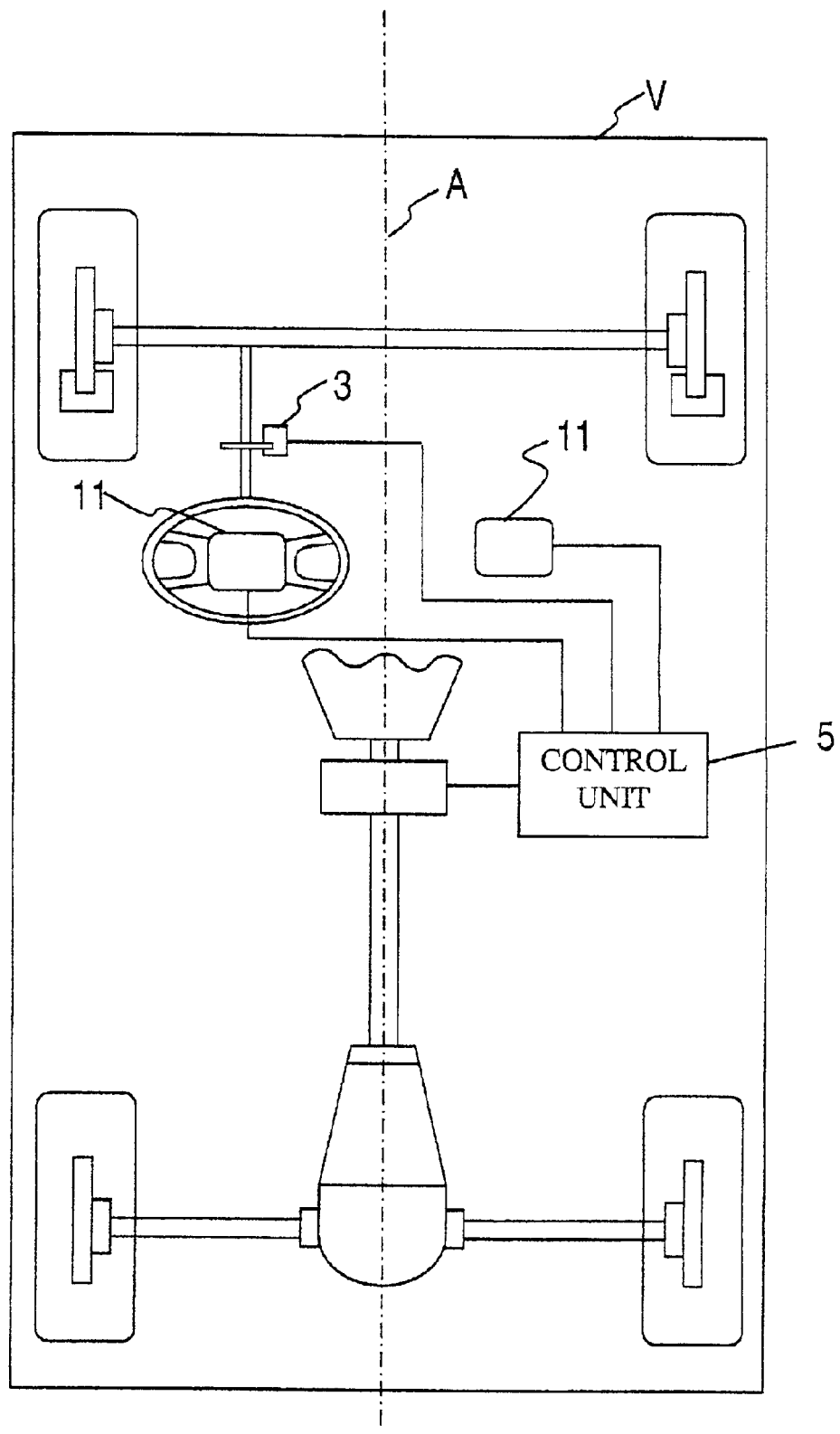
FIG. 3 is a diagrammatic illustration of a vehicle equipped with the passenger restraint system in accordance with the present invention illustrated in FIGS. 1 and 2.

Referring initially to FIG. 3, a vehicle V is diagrammatically illustrated to explain a passenger restraint system in accordance with a first embodiment of the present invention. As explained below in more detail, the passenger restraint system of the present invention controls the deployment of one or more passenger restraint devices 11 mainly on the roll angle and the steering angle of the vehicle V. More specifically, when the steering of the vehicle V is turned in the same direction as the roll direction before the roll angle of the vehicle V exceeds a first prescribed angle, the passenger restraint system of the present invention assumes the vehicle V is headed toward recovering from the rollover behavior and subtracts a prescribed angle successively from the roll angle. Thus, the passenger restraint device 11 is not actuated in cases where the steering operation will end the rollover behavior. Meanwhile, the passenger restraint device 11 can be operated more appropriately in cases where the steering is not operated and the vehicle V rolls over and cases where operation of the steering begins to effect a recovery but ultimately the vehicle V rolls over anyway.

Since the rate at which the vehicle V recovers from the rollover behavior differs depending on the steering angle, the passenger restraint system of the present invention can vary the prescribed angle that is subtracted from the roll angle in response to the steering angle and thereby actuate the passenger restraint device 11 more appropriately.

Figure 1:
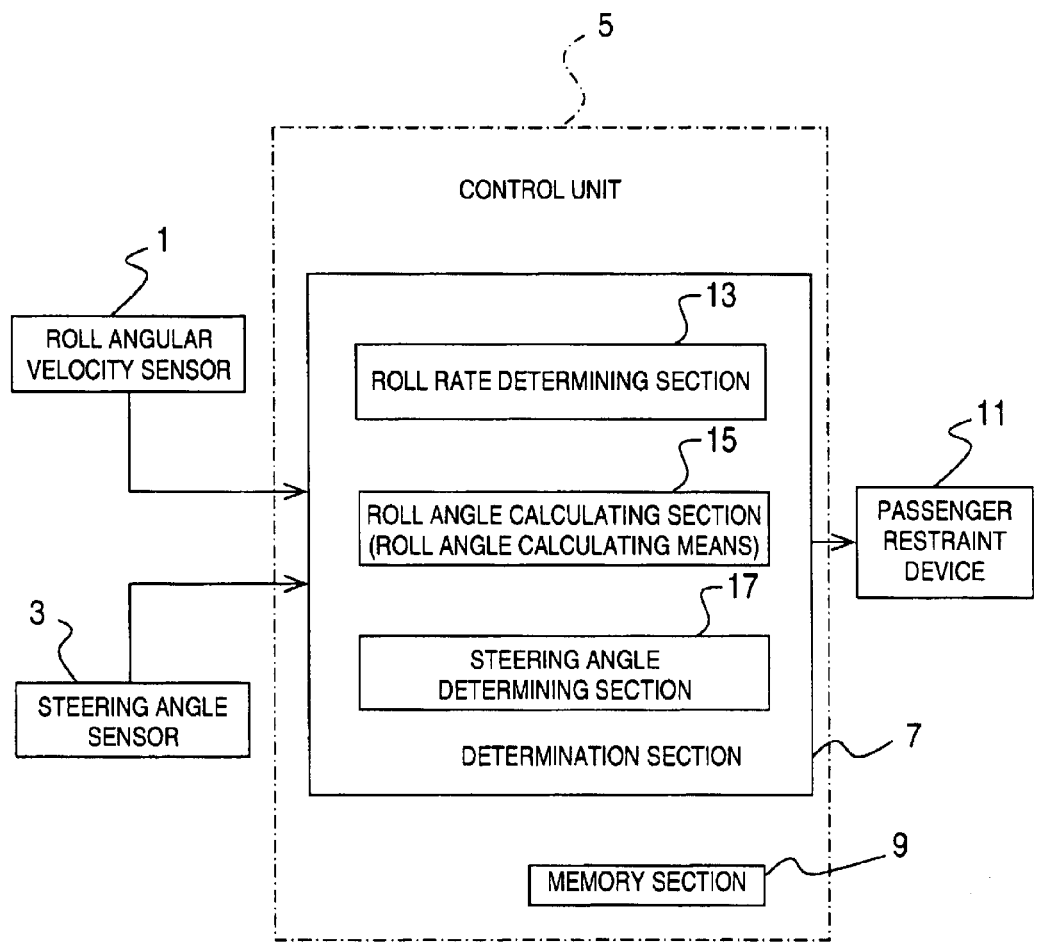
FIG. 1 is a control block diagram showing the overall constitution of a passenger restraint system in accordance with one embodiment of the present invention.

FIG. 1 is a control block diagram showing the overall constitution of the passenger restraint system that embodies the present invention. This passenger restraint system is provided with a roll angular velocity sensor 1 that serves as a roll angular velocity detecting device for detecting the rotational or roll angular velocity of the vehicle V about its longitudinal axis A and a steering angle sensor 3 that serves as a steering angle detecting device for detecting the steering angle. The detection signals from the sensors 1 and 3 are fed into a control unit 5 that serves as a control device. The sensors 1 and 3 are conventional components that are well known in the art. Since sensors 1 and 3 are well known in the art, the structure of the sensors 1 and 3 will not be discussed or illustrated in detail herein.

The control unit 5 preferably includes a microcomputer having a CPU (Central processing unit, a ROM (Read Only Memory) device, and a RAM (Random Access Memory) device that has a control program that controls the passenger restraint system as discussed below. In other words, the microcomputer of the control unit 5 is programmed to calculate and determine various parameters to control the deployment of the passenger restraint device 11. The control unit 5 can also include other conventional components such as an input interface circuit, an output interface circuit, and other storage devices. The memory circuit stores processing results and control programs such as ones for the operations that are used to control the deployment of the passenger restraint device 11. The control unit 5 is operatively coupled to the sensors 1 and 3 and the passenger restraint device 11 in a conventional manner. It will be apparent to those skilled in the art from this disclosure that the precise structure and algorithms for the control unit 5 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The control unit 5 basically includes a determination section 7 and a memory section 9. Based on the signals received from the sensors 1 and 3 and various setting values stored in the memory section 9, the control unit 5 determines if the vehicle V will rollover. When the control unit 5 determines that the vehicle V will rollover, the control unit 5 actuates the passenger restraint device 11. The passenger restraint device 11 is preferably one or more air bags and/or other devices that restrain the passenger's body.

The determination section 7 of the control unit 5 has a roll rate determining section 13, a roll angle calculating section 15 and a steering angle determining section 17. The roll rate determining section 13 compares the roll rate (roll angular velocity) detected by the roll angular velocity sensor 1 with a threshold value. The roll angle calculating section 15 calculates the roll angle based on the roll rate and compares the calculation result with a threshold value. The steering angle determining section 17 determines if the steering angle detected by the steering angle sensor 3 is oriented in the same direction as the roll direction of the vehicle V, i.e., the steering wheel of the vehicle V is turned towards the side of the vehicle V in which the vehicle V is rolling.

Figure 2:
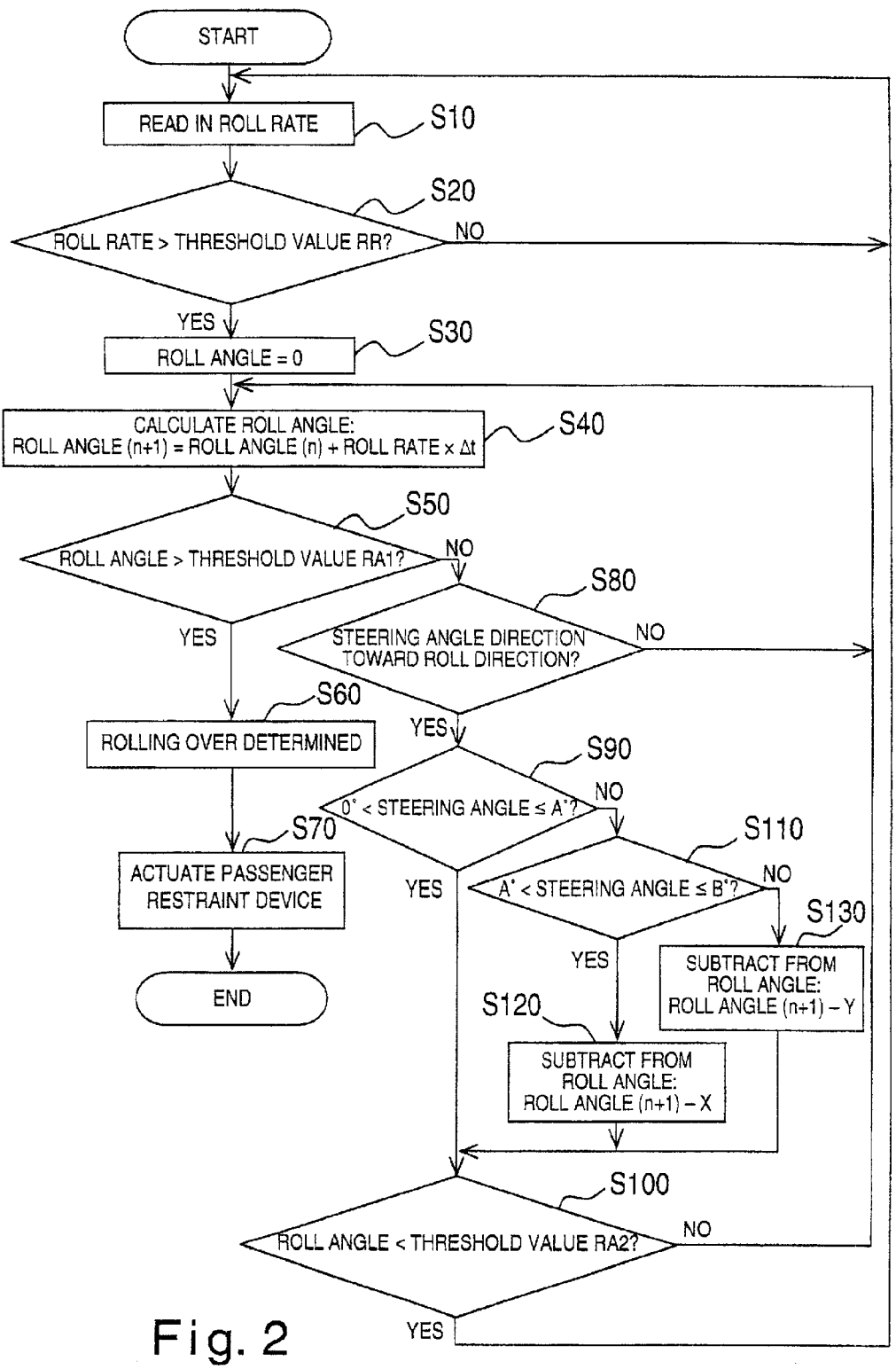
FIG. 2 is a flowchart showing the control operations of the control unit for the passenger restraint system of the present invention illustrated in FIG. 1.

Next, the operation of the passenger restraint system 11 will be explained based on the flowchart of FIG. 2. The flowchart of FIG. 2 shows the control operations of the control unit 5. First in step S10, the control unit 5 reads in the roll angular velocity (roll rate) detected by the roll angular velocity sensor 1. Then, in step S20, the control unit 5 compares this roll rate with the roll rate threshold value RR, which is the prescribed angular velocity for the particular vehicle V.

If the roll rate is determined to exceed the threshold value RR, then the control unit 5 first resets the roll angle to zero (step S30), and then the control unit 5 updates the roll angle with an integration calculation (step S40) using the following equation:

$$\text{roll angle }(n+1)=\text{roll angle }(n)+\text{roll rate}\times\Delta t,$$

where $\Delta t$ is the control time period of this routine.

The roll angle obtained is then compared with a prescribed threshold value RA1, e.g., a first prescribed roll angle (step S50). If the roll angle is determined to exceed the threshold value RA1, then the vehicle V is determined to be rolling over (step S60), and then the passenger restraint device 11 is actuated (step S70). As a result, the passenger is restrained by the passenger restraint device 11 when the vehicle V is experiencing a rollover behavior.

In step S50, if the roll angle is determined not to exceed the threshold value RA1, then the control unit 5 reads in the detection value from the steering angle sensor 3. Then, based on this detection value from the steering angle sensor 3, the control unit 5 determines if the steering direction of the vehicle V is the same as the roll direction of the vehicle V (step S80). If the directions are the same, i.e., the steering wheel is turned towards the direction in which the vehicle V is rolling, then the control unit 5 determines if the steering angle $\theta$ lies within the range $0°<\theta\leq A°$ (step S90), where A° is a first prescribed steering angle. If the steering angle lies within the range $0°<\theta\leq A°$, then the control unit 5 determines that the steering has moved due to unevenness of the road surface or the like, and proceeds to step S100 without executing the subtraction routine from the roll angle.

If the steering angle does not lie in the range $0°<\theta\leq A°$ in step S90, then the control unit 5 determines if the steering angle $\theta$ lies in the range $A°<\theta\leq B°$ (step S110), where B° is a second prescribed steering angle. If the steering angle lies in the range $A°<\theta\leq B°$, then the control unit 5 determines that the passenger is operating the steering, but the steering angle is not large. The control unit 5 then subtracts (step S120) a predetermined angle X, which is a prescribed value for the particular vehicle V, from the roll angle (n+1) previously calculated in step S40, and then proceeds to step S100.

If the steering angle does not lie in the range A°<θ≦B° in step S110, then the control unit 5 determines if that the rollover behavior is highly likely to end because the passenger is turning the steering to a large degree. The control unit 5 then subtracts (step S130) a predetermined angle Y, which is a prescribed value for the particular vehicle V that is larger than predetermined angle X, from the aforementioned roll angle (n+1) and proceeds to step S100.

In step S100, the control unit 5 determines if the roll angle is smaller than a threshold value RA2, e.g., a second prescribed angle. If the roll angle is smaller than threshold value RA2, the control unit 5 returns to step S10 and executes the same processing. Conversely, if the roll angle is not smaller than the threshold value RA2, then the control unit 5 returns to step S40 and executes the same processing.

Thus, with the embodiment just described, when the steering of the vehicle V is turned in the same direction as the roll direction before the roll angle of the vehicle V exceeds the threshold value RA1, then the control unit 5 assumes the vehicle V is headed toward recovering from the rollover behavior and subtracts the predetermined angle successively from the roll angle in accordance with the steering angle. When the reduced roll angle falls below threshold value RA2, then the control unit 5 repeats the processing from step S10 where it reads in the roll rate. In other words, when the roll angle obtained after subtraction is below the threshold value RA2, the control unit 5, in effect, resets both the determination of whether or not the roll angular velocity exceeds the threshold value RR (step S20) and the determination of whether or not the roll angle exceeds the threshold value RA1 (step S50).

Thus, in a vehicle V equipped with the passenger restraint system, the passenger restraint device 11 is not actuated in cases where the steering operation will end the rollover behavior. However, in a vehicle V equipped with the passenger restraint system, the passenger restraint device 11 can be more appropriately actuated in cases where the steering is not operated and the vehicle V rolls over and cases where operation of the steering begins to effect a recovery but ultimately the vehicle V rolls over anyway.

As used herein, the following directional terms "forward, rearward, above, downward, vertical, horizontal, below, longitudinal and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

Moreover, terms that are expressed as "means-plus function" in the claims should include any structure that can be utilized to carry out the function of that part of the present invention.

This application claims priority to Japanese Patent Application No. 2001-228101. The entire disclosure of Japanese Patent Application No. 2001-228101 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A passenger restraint system comprising:

a roll angular velocity detecting device configured to detect a roll angular velocity about a longitudinal axis of a vehicle;

a roll angle calculating device configured to calculate a roll angle of the vehicle based on the roll angular velocity detected by the roll angular velocity detecting device;

a steering angle detecting device configured to detect a steering angle;

a passenger restraint device configured to restrain a passenger; and a control unit configured to actuate the passenger restraint device when the roll angular velocity detected by the roll angular velocity detecting device exceeds a prescribed angular velocity and the roll angle calculated by the roll angle calculating device exceeds a first prescribed angle, the control unit being further configured to subtract a prescribed value from the roll angle successively, when the roll angular velocity detected by the roll angular velocity detecting device exceeds the prescribed angular velocity and the steering angle detecting device detects the steering angle to be oriented toward a side of the vehicle in which the vehicle is rolling before calculation of the roll angle by the roll angle calculating device exceeds the first prescribed angle, and the control unit being further configured to reset a determination of whether or not the roll angular velocity is greater than or equal to the prescribed angular velocity and a determination of whether or not the roll angle is greater than or equal to the first prescribed angle, when the roll angle obtained after subtracting falls below a second prescribed angle.

2. The passenger restraint system as recited in claim 1, wherein the control unit is configured to vary the prescribed value that is subtracted from the roll angle depending on the steering angle.

3. The passenger restraint system as recited in claim 2, wherein the prescribed value equals 0 when the steering angle is between 0° and less than or equal to a first prescribed steering angle A°, the prescribed value equals a first predetermined value X when the steering angle is between the first prescribed steering angle A° and a second prescribed steering angle B°, and the prescribed value equals a second predetermined value Y that is greater than the first predetermined value X when the steering angle is larger than the second prescribed steering angle B°.

4. A passenger restraint system comprising:

roll angular velocity detecting means for detecting a roll angular velocity about a longitudinal axis of a vehicle;

roll angle calculating means for calculating a roll angle of the vehicle based on the roll angular velocity detected by the roll angular velocity detecting device;

steering angle detecting means for detecting a steering angle;

passenger restraint means for restraining a passenger; and control means for actuating the passenger restraint means based on the roll angular velocity detected by the roll angular velocity detecting means exceeding a prescribed angular velocity, the roll angle calculated by the roll angle calculating means exceeding a first prescribed angle, the control means being programmed to subtract a prescribed value from the roll angle successively, when the roll angular velocity detected by the roll angular velocity detecting means exceeds the prescribed angular velocity and the steering angle detecting means detects the steering angle oriented toward a side of the vehicle in which the vehicle is rolling before calculation of the roll angle by the roll angle calculating means exceeds the first prescribed angle, and the control means being programmed to reset a determination of whether or not the roll angular velocity is greater than or equal to the prescribed angular velocity and a determination of whether or not the roll angle is greater than or equal to the first prescribed angle, when the roll angle obtained after subtracting falls below a second prescribed angle.

* * * * *